United States Patent [19]
Hickling

[11] Patent Number: 5,190,313
[45] Date of Patent: Mar. 2, 1993

[54] IMPACT CUSHIONING DEVICE

[76] Inventor: Robert Hickling, 323 Country Club Rd., Oxford, Miss. 38655

[21] Appl. No.: 741,348

[22] Filed: Aug. 7, 1991

[51] Int. Cl.[5] .................. B60R 21/22; B60R 21/24
[52] U.S. Cl. ............................ 280/731; 244/121; 280/743
[58] Field of Search ............... 280/731, 730, 728, 743; 244/118.5, 121

[56]  References Cited

U.S. PATENT DOCUMENTS

| | | | |
|---|---|---|---|
| 1,563,374 | 12/1925 | Kearney | 244/121 |
| 2,032,711 | 3/1936 | Moles | 244/121 |
| 3,614,127 | 10/1971 | Glance | 280/729 |
| 3,614,129 | 10/1971 | Sobkow | 280/730 |
| 3,618,979 | 11/1971 | Gulette | 280/731 |
| 3,819,203 | 6/1974 | Radke et al. | 280/731 |
| 3,887,214 | 6/1975 | Brawn | 280/730 |
| 5,018,762 | 5/1991 | Suzuki et al. | 280/743 |

FOREIGN PATENT DOCUMENTS

| | | | |
|---|---|---|---|
| 3833889 | 4/1990 | Fed. Rep. of Germany | 280/730 |
| 2-74440 | 3/1990 | Japan | 280/730 |

*Primary Examiner*—Karin L. Tyson
*Attorney, Agent, or Firm*—Bacon & Thomas

[57] ABSTRACT

An impact cushioning device is described for use in preventing direct contact between the terminal end portion of an elongated object and a person that may be driven toward the object for any reason. The cushioning device has application in a vehicle to protect an occupant from impacting an elongated object upon sudden deceleration of the vehicle and comprises an inflatable safety bag having a reservoir portion, a cushion portion, and an elongated inflatable duct portion which provides fluid communication between the reservoir and the cushion. The duct portion includes flow baffles and orifices for restricting free-flow of pressurized gas between the reservoir and the cushion until the duct portion is substantially fully inflated and providing a pressure gradient from the cushion to the reservoir through a period in which impact can occur. The cushion includes two complementary sections which abut each other in an axial direction when the cushion is fully inflated, in which condition the cushion engages the terminal end of the elongated object. The complementary cushion sections abut along an interface that is interlocked to prevent separation of the cushion sections in the event of impact with the cushion by an object moving axially towards the cushion. The complementary cushion sections may also have an inflatable cover portion to prevent cushion separation and provide a smoother surface for impact. The cushion is normally stowed at a position along the elongated object remote from the terminal end and, when inflated, moves over the terminal end and covers the latter.

26 Claims, 3 Drawing Sheets

IMPACT CUSHIONING DEVICE

BACKGROUND OF THE INVENTION

1. Field of the Invention

The present invention pertains to an impact cushioning device and more specifically to an inflatable safety bag arrangement used to cover an object in a vehicle that would likely cause injury, for example to a vehicle occupant, in the event of sudden deceleration of the vehicle, where the safety bag system cannot be placed at or within the terminal end of the object but, due to various constraints, must be mounted on and deployed from some adjacent area of the structure.

2. Description of the Prior Art

The use of safety air bag systems in vehicles to protect an occupant in the event of a collision is now becoming widely accepted as part of a standard for basic vehicle safety measures. In prior art occupant safety systems generally employed in automobiles, for example, air bags are located either within a steering wheel or a portion of the vehicle console and function, in the event of a collision or sudden deceleration, to inflate outwards towards the vehicle occupant in order to restrain the occupant against forward movement caused by the momentum of the occupant and potential injuries caused by direct contact of the occupant with rapidly decelerating or stopped vehicle structure. These arrangements restrain movement of the occupant by a cushion effect.

Additional impact cushioning devices are known in the art for use with vehicles. In one type of known arrangement, an inflatable impact cushioning device is stored within a vehicle steering wheel, inflates in the event of sudden deceleration and cushions a driver's impact with the steering wheel. In another type of known arrangement, an impact cushioning bag is provided on or in the dashboard of a vehicle in order to prevent the impact of a passenger against the dashboard in the event of a collision.

In all of the above described prior art safety arrangements, the cushioning bag is placed on the surface of the object or directly between the object and the occupant to be protected. Neither of these arrangements can be used in applications, however, where a safety cushion system is required to cover an object that would be injurious in a crash but where the cushioning medium cannot be placed on the surface of the object in line with the occupant, but has to be deployed from some adjacent structure located either directly behind, below or above the object. More specifically, the prior art lacks an emergency impact cushioning arrangement which can protect an occupant of a vehicle from injury caused by direct contact with a terminal end portion or area of an elongated or narrow ended object in the event of sudden deceleration of the vehicle and wherein a cushioning material cannot be directly placed at the end of the object due to functional and structural constraints.

It is therefore an object of the present invention to provide an inflatable impact cushioning system which is capable of covering the terminal end portion of an object in a vehicle, for example, that would be injurious to an individual in the event of sudden deceleration of the vehicle, but which cannot be functionally incorporated in the terminal area of the object during normal vehicle operation. It is another object of the present invention to provide an inflatable impact cushioning system which is mounted adjacent the terminal end portion of an object to be covered in the event of sudden deceleration of the object and which is deployed so as to extend, from this adjacent location, around the object and to cover it in order to provide adequate cushioning to prevent injury to a person moving towards the object.

SUMMARY OF THE INVENTION

The present invention provides an impact cushioning device for use in a moving vehicle within which is located an object which may be directly contacted by a person and which may cause injury in the event of sudden deceleration of the vehicle. The impact cushioning system of the present invention is particularly adapted for use in a vehicle in order to protect the occupant thereof from coming into direct contact with a terminal end portion of an object which, due to functional or structural constraints, cannot house the impact cushioning system at the terminal end of the object between the object and the occupant.

As contemplated by the present invention, the impact cushioning device comprises an inflatable safety bag which, in the preferred embodiment, is stored in a chamber mounted on a support for a relatively narrow ended object adjacent its terminal end and that is to be cushioned in the event of an impact between a person and the object. More specifically, the impact cushioning system includes an inflator device preferably formed as a ring which is mounted about the support for the object, and which is used to supply pressurized gas medium for inflating a safety bag. The safety bag itself preferably comprises an inner toroidal reservoir chamber which is initially inflated by gas pressure admitted from the inflator and an inflatable annular duct continuous with the chamber and which generally extends parallel to the support member and beyond the terminal end of the object to be cushioned. A cushion member extends between the annular duct portions at the end of the object at an area remote from the inner toroidal reservoir chamber. The cushion in its preferred form, generally comprises two complementary sections which interengage each other and abut the terminal end of the object so as to prevent direct contact with the end of the object by a person suddenly and rapidly impacting the object. The inflatable duct provides gas pressure communication between a gas inflator in an inner toroidal reservoir chamber and the cushion sections, and also restrains the cushion sections against motion away from the end of the object. The gas passage in the duct between the toroidal reservoir and the cushion cover sections includes restrictive baffles to control the flow of pressure in the duct to provide for sequential inflation of the cushion; i.e., the toroidal reservoir chamber is substantially fully inflated prior to inflation of the annular duct which is substantially fully inflated prior to inflation of the cushion sections.

Upon inflation of the cushion, gas flow from the inflator device maintains the highest gas pressure of the air bag system within the toroidal reservoir chamber. Because of the various restrictions to gas flow in the system, gas pressure decreases from the reservoir chamber through the annular duct to the cushion, immediately prior to impact. This pressure gradient supports the air bag system from below the toroidal reservoir chamber to the cushion sections. Therefore, gas pressure is lowest in the cushion sections to provide a softer restraint during impact of the occupant with the cushion, while providing stronger more resilient support through the duct and the toroidal reservoir, where the gas pressure is greater.

The impact cushioning device of the present invention has particular application for use with sighting tubes such as used in military combat vehicles, for example, armored vehicles, submarines, and attack helicopters. For instance, in an attack helicopter, the sighting tube is positioned directly in front of the gunner. Generally the helicopter operates at low altitudes and if the helicopter is hit by ground fire or otherwise disabled, there is little opportunity for the gunner to avoid direct impact with the sighting tube if the helicopter suddenly decelerates for any reason; e.g., if it is forced to earth and impacts with sudden deceleration. The gunner's chances of surviving could be greatly improved if direct impact with this sighting tube could be avoided.

DESCRIPTION OF THE PREFERRED EMBODIMENT

Figure 1:
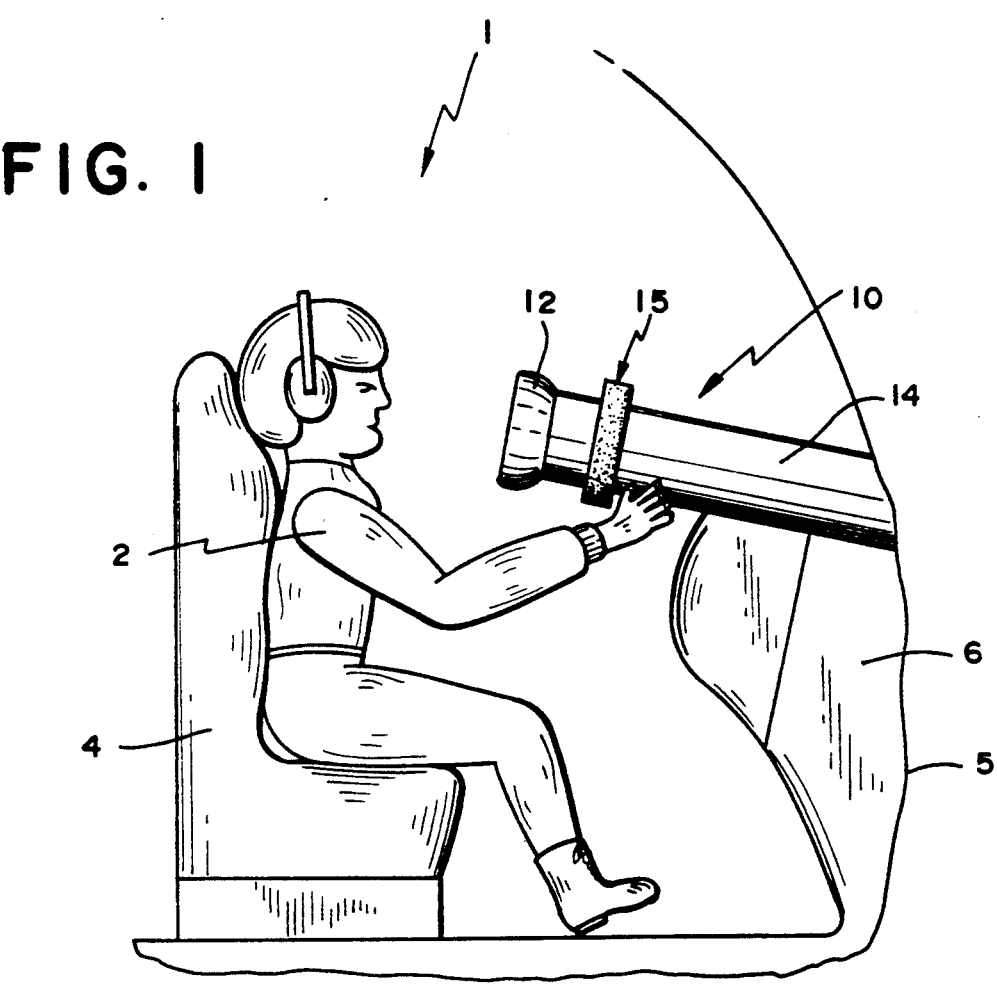
FIG. 1 is a perspective view of an occupant within a vehicle, for example a helicopter, having a sighting tube which embodies the impact cushioning device of the present invention.
Figure 2:
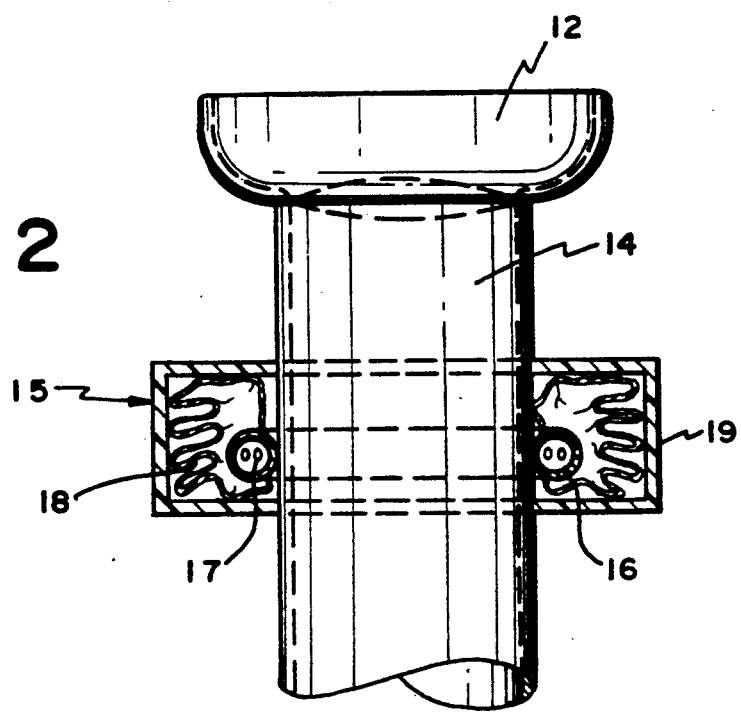
FIG. 2 is a enlarged view of the vehicle sighting tube in an upright position with the impact cushioning device of the present invention mounted thereon in a storage position.

As exemplified in the preferred embodiment, the impact cushioning device of the present invention can be utilized to protect the occupant of a vehicle such as a combat helicopter from coming into undesired contact with a sighting tube in the vehicle. With reference to FIG. 1, numeral 1 generally indicates the gunner area of a helicopter vehicle, such as an attack helicopter. As shown therein, located within the gunner area is an occupant 2, an occupant seat 4, front vehicle body portion 5, console section 6 and an optical viewing device generally indicated at 10. Optical viewing device 10 includes a viewing element 12 at its terminal end and an elongated support member 14. Fixedly mounted or stowed upon elongated support member 14, as represented in FIGS. 1 and 2, is the impact cushioning assembly 15 of the present invention shown located within or stowed within housing chamber 19 made from any suitable material which can be easily ruptured upon inflation of the impact cushioning assembly 15.

Figure 3:
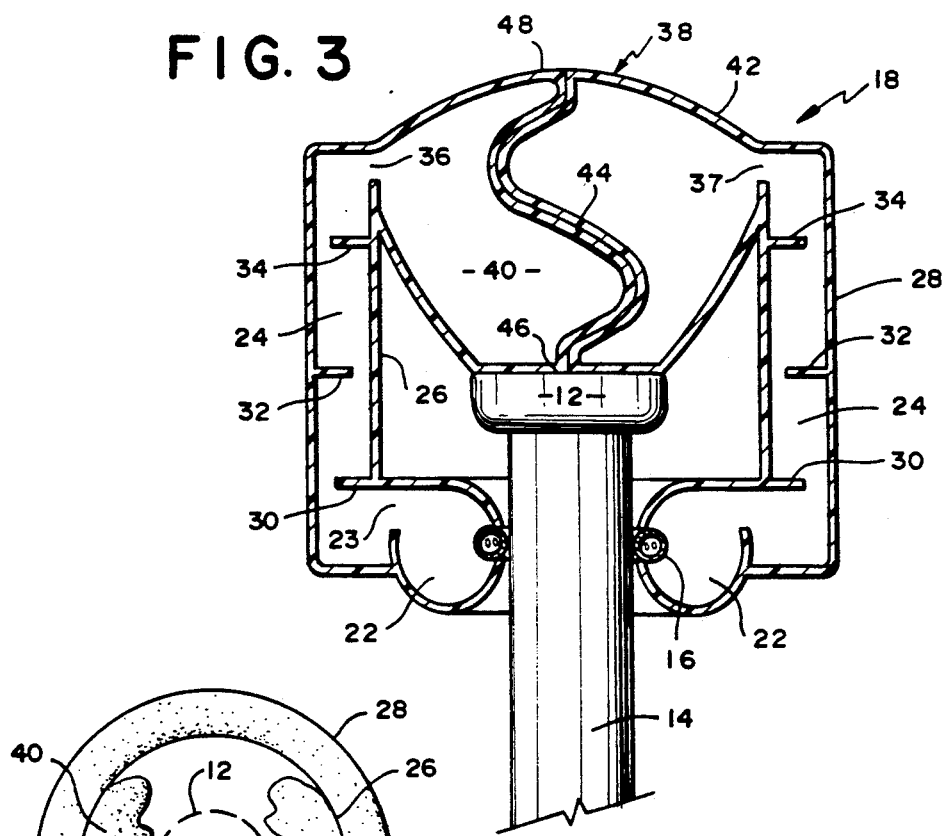
FIG. 3 is an enlarged view of the impact cushioning device of the present invention in its fully inflated condition upon a sighting tube.

Impact cushioning assembly 15 may be located on the elongated support member 14 by means of a gas inflator ring 16. The inflator ring can be directly secured to the elongated support member by any suitable means. Ring 16 extends through a portion of a safety bag 18 as best shown in FIG. 3, and not only serves to secure a portion of a safety bag 18 at a suitable point along the length of elongated support member 14 remote from end 12, but also includes peripheral holes 17 through which a pressurized gas can be discharged in order to inflate the safety bag 18. Holes 17 are located at predetermined locations around the periphery of the inflator ring 16 so that the directional flow of fluid from the inflator ring 16 is outward. Providing an outward flow assures that the resulting force on the ring will be inward against the sighting tube which will support the ring and prevent it from buckling. The inflator ring 16 is actually a tube containing a pyrotechnic material which can be ignited and will produce a pressurized gas for inflating the cushion bag. Also, it is possible to supply gas from a compressed gas source to inflate the safety air bag system. The gas source in the latter case would be connected to the inflator ring which acts as a diffuser for distributing the gas outflow into the toroidal reservoir chamber 22 (to be described below) evenly around the support member 14.

During actuation, gas pressure flowing through holes 17 and ring 16 fills a toroidal reservoir chamber 22 of safety bag 18. Toroidal reservoir chamber 22 is generally in the form of a torus and the force of deployment of this toroidal chamber 22 shakes lose the remainder of safety bag 18 as will be discussed more fully below. Chamber 22 in accordance with the preferred embodiment is a portion of an inflatable duct 24 to be described below. Actuation of the gas pressure source does not constitute a part of the present invention, and systems are well known to those skilled in the art. For example, it s generally well known to utilize a suitable inertia weight in combination with an electrically or mechanically operated switch to activate energization of a gas pressure source to inflate a safety bag in a vehicle.

Following deployment of the toroidal chamber 22, gas pressure then flows out of the chamber 22 through restrictive passages 23 into an inflatable duct 24 preferably comprising inner and outer elongated annular walls 26 and 28 extending longitudinally along the axis of the support 14. The duct 24 preferably extends concentrically along support member 14 towards the terminal end of the viewing device 10 from its attachment point on the support 14. Duct 24 contains numerous baffles or partitions 30, 32, 34 which define free-flow restrictive means between successive levels and passageways of the duct 24. Thus, the baffles 30, 32, 34 define flow restrictors to restrict the free-flow of pressurized fluid through the annular duct 24 so that inflation of the annular duct 24 causes safety bag 18 to be deployed beyond the terminal end of viewing element 12 where it is restricted or restrained from further deployment by the duct 24 and the attachment between the duct 24 and the support 14.

At the end of annular duct 24, remote from toroidal reservoir chamber 22 are located several restrictive inlet orifices 36, 37 to cushion or cover sections generally indicated at 38. Cushion 38 in the preferred embodiment, includes a left side portion 40 and a right side portion 42 as viewed in FIG. 3. Side portions 40 and 42, due to the presence of the restrictive entrance orifices 36, 37, are inflated subsequent to the annular duct 24 being substantially fully inflated. As shown in FIG. 3, when fully inflated, left and right side portions 40, 42 interlock along a curvilinear interlocking interface 44 which will be discussed more fully below.

The restrictive passages 23 from the toroidal chamber 22 to the duct 24, the baffles and partitions 30, 32 34 which restrict flow in the duct 24 and the restrictive orifices 36, 37 between the duct 24 and the cushion sections 38 are designed also to create a pressure gradient in gas flow from the inflator 16 in the reservoir through the duct 24 to the cushion. The lower pressure in the cushion sections 38 provides a softer restraining force for impact of the occupant with the cushion sections 38. At the same time, the increase in pressure down through the duct 24 to the reservoir chamber 22 provides a stronger more resilient support in the remainder of the air bag system.

As clearly shown in FIG. 3, cushion 38 includes a bottom wall 46 and a top wall 48. When fully inflated, bottom wall 46 of safety bag 18 abuts against the terminal end of optical viewing element 12 such that in the event of sudden vehicle deceleration, occupant 2 would be prevented from coming into direct contact with viewing element 12 but rather would come into contact with top wall 48 thereby avoiding serious injury.

The fact that the interface between the left side portion 40 and right side portion 42 of the cushion does not lie in a single plane is important. With the curvilinear interface, left side 40 and right side portion 42 of cushion cover 38 are complementary and fit together in such a way so as to prevent the head or body of occupant 2 from passing between the two cover portions and striking the terminal end of support 14 at viewing element 12 in the event of impact between occupant and the air cushion bag. In other words, a generally interlocked face connection 44 embodied in the present invention provides for a distribution of the direct axial load that would be encountered on the cushion 38 of safety bag 18 upon impact of the occupant 2 such that left side portion 40 and right side portion 42 will not tend to separate by pivoting about inner ring 16 or generally deforming safety bag 18. While a generally curvilinear or sinusoidal interface is preferred, other interface shapes capable of achieving the same results could be used.

Figure 4A:
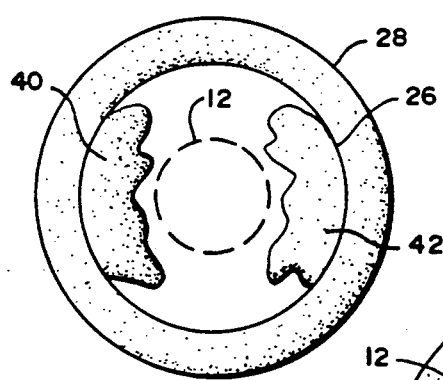
FIGS. 4a, 4b and 4c depict the sequential deployment of the impact cushioning device of the invention.
Figure 4B:
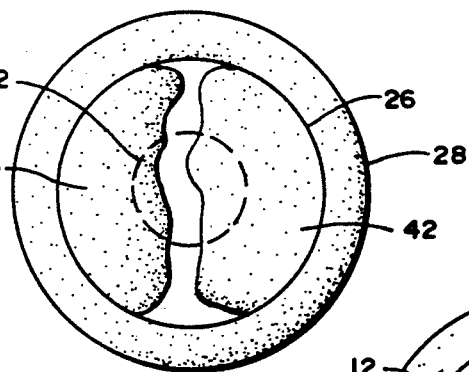
Figure 4C:
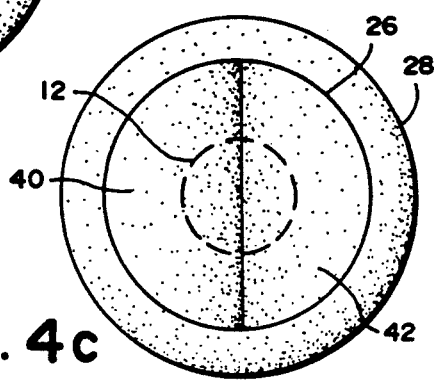

FIGS. 4a–4c represent a time sequence showing how the two parts of the cushion of the interlocking safety bag system of the present invention inflate and fit together. As represented in FIG. 4a, the toroidal reservoir chamber 22 and the annular duct 24 have already been inflated and inflation through passageways on opposite sides of the top of the inner wall 26 of annular duct 24 i.e. through restrictive entrance orifices 36, 37 into left side portion 40 and right side portion 42 has begun. In FIG. 4b, inflation of left side portion 40 and right side portion 42 has continued both against the inner wall 26 of annular duct 24 and towards each other. FIG. 4c represents a completion of the inflation of safety bag 18 and basically constitutes a top view of the safety bag arrangement shown in FIG. 3.

Figure 5:
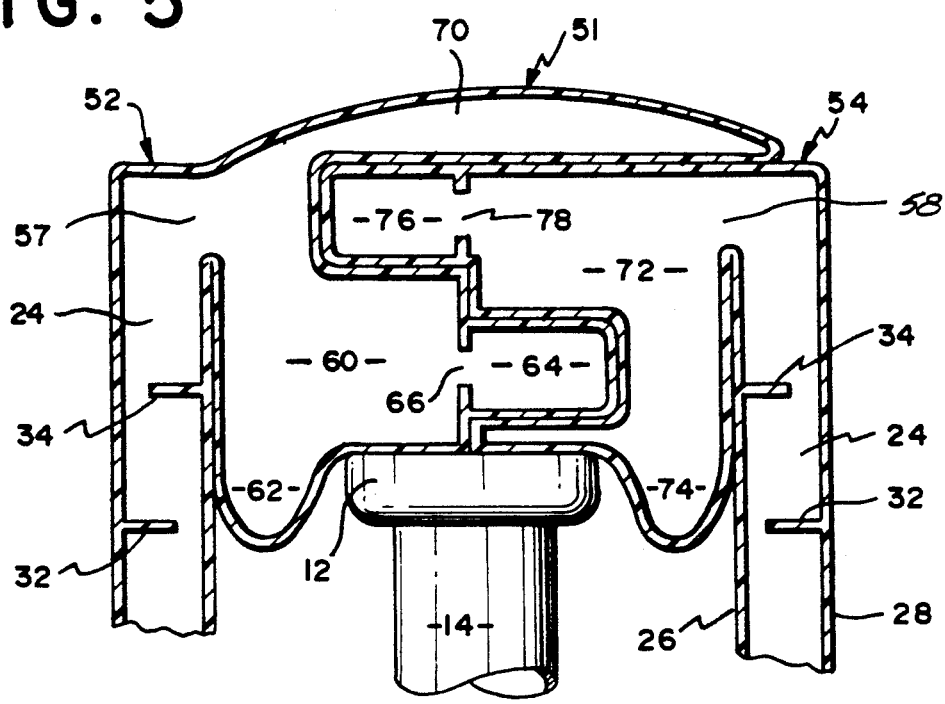
FIG. 5 is a view similar to that shown in FIG. 3 but depicting a modified impact cushioning device embodiment.
Figure 6:
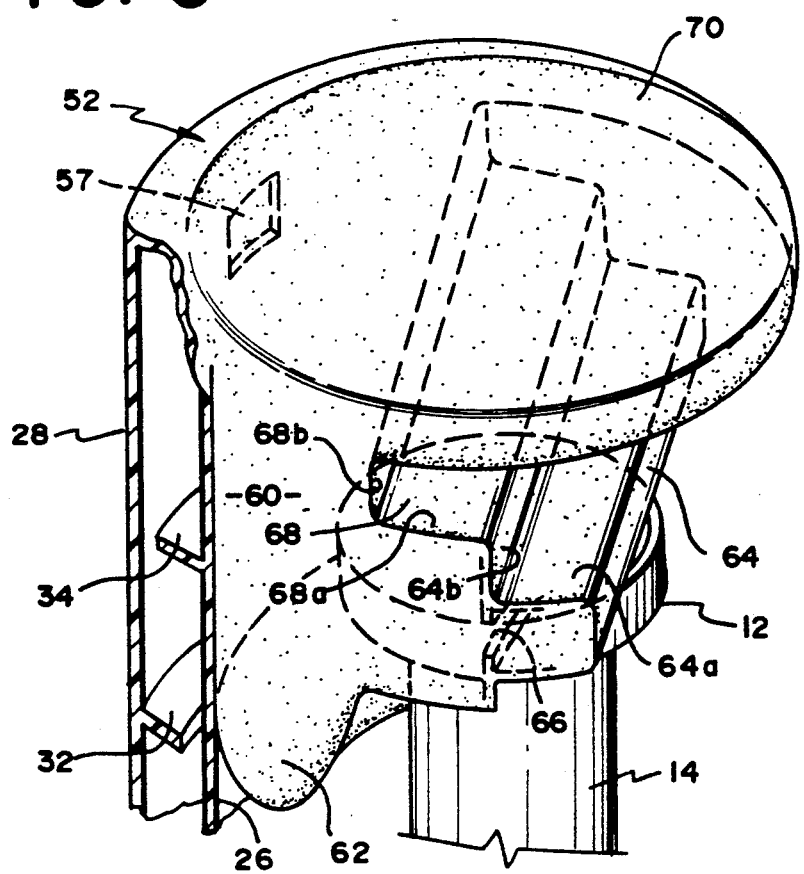
FIG. 6 is a perspective view of a portion of the impact cushion embodiment shown in FIG. 5.

The embodiments shown in FIGS. 5 and 6 are intended to illustrate that the shape of safety bag 18 may take different forms without departing from the spirit of the invention. The embodiments shown in these two figures utilize a different interlocking interface connection and introduce a compartmentalization feature as will be discussed more fully below. The same reference numerals utilized in the FIG. 3 embodiment have been carried over into the FIGS. 5 and 6 embodiment for similar elements and therefore a description of these elements will not be repeated except wherever necessary.

As shown in FIG. 5, this alternative embodiment includes a cushion cover 51 comprised of left side portion 52 and right side portion 54. Left side portion 52 is in fluid communication with annular duct 24 through entrance passage 57. Likewise, right side portion 54 is in fluid communication with annular duct 24 through entrance passage 58. Entrance passages 57 and 58 may be less restricted than entrance orifices 36 and 37 in the FIG. 3 embodiment since cushion 51 is generally larger than cushion 38 in the FIG. 3 embodiment and therefore may require a larger volumetric flow rate in order to minimize the expansion time of the safety bag 18.

Left side portion 52 of cushion 51 comprises a main axial chamber section 60, protruding compartment 64, a concavity 68 (shown best in FIG. 6) both of the latter including axial and radially extending wall portions 68a, 68b, 64a and 64b, and cushion section 70. Main chamber 60 also includes a diaphragm section 62 which permits increased inflation of left side portion 52 and better conformity with the terminal end of viewing device 10. A restricted passage 66 is located between main chamber 60 and compartment 64 for the reasons which will be more fully described below. Similar to left side portion 52, right side portion 54 of cushion 51 includes a main chamber section 72, a diaphragm section 74, a protruding compartment 76 and a protrusion complementary (not numbered) to concavity 68 of left side portion 52 which conforms to (i.e., interfits with) compartment 64 when the cushion halves are inflated.

As clearly shown in FIG. 5, when cushion 51 is expanded, compartment 64 of left side portion 52 conforms to and abuts the concavity (not labeled) in right side portion 54 and compartment 76 of right side portion 54 conforms to and abuts concavity 68 in left side portion 52. Cushion section 70 of left side portion 52 extends over a substantial portion of the top section of right side portion 54 and also overlies the interface between the cushions. The purpose of cushion cover 51 is to protect against face lacerations that could result from impact by an occupant with the joint between the two principal parts of the interlocking safety bag 18 shown in the FIG. 3 embodiment. Cushion cover 51 is preferably made with a smooth surface without seams, except around the edges. For maximum benefit, the inflated cushion cover 51 is intended to extend partially or even totally over the terminal end of the right side of annular duct 24 which is opposite to the side of the annular duct 24 from which it is inflated. Since it is important that the cover deploy quickly over the two interlocking parts of safety bag 18, additional partitions (not shown) can be used to direct fluid flow principally to the cover until it is inflated.

With the use of compartmentalization as in the FIG. 5 embodiment, restricted passages 66 and 78 will reduce the fluid flow in and out of respective compartments 64 and 76. This tends to make the bag more resistant to deformation, which may be necessary in certain applications. The force of impact on the upper surface of cushion cover 51 of safety bag 18 forces left and right side portions 52, 54 downward and outward against the annular duct 24 surrounding them. Annular duct 24 opposes the force exerted on the interlocking safety bag 18 tending to push bag 18 outwards, mainly through the hoop stress of the bag material of the annular duct 24, particularly the inner surface 26 of annular duct 24. The force of the interlocking left and right side portions 52, 54 pressing against annular duct 24 can be distributed further down the annular duct 24 by the presence of diaphragm sections 62 and 74 that overhang the terminal end 12 of tube 14. Therefore, left and right side portions 52, 54, upon impact, may inflate downwardly below optical viewing element 12 by expanding diaphragm sections 62 and 74.

Safety bag 18 of the present invention in its stowed and deflated position as represented in FIG. 2 is folded in successive levels preferably with the toroidal reservoir chamber 22 at the bottom, the annular duct 24 in the middle, and the interlocking cushions 38 or 51 on top. This arrangement ensures that the different sections are located in the appropriate positions prior to inflation. It is important that the cushions 38 or 51 of safety bag 18 get transported upwardly past the terminal viewing element 12 before they start to inflate. Also, duct 24 must be in the proper position relative to left and right side portions 40, 42 of cushion portion 38 or left and right side portions 52, 54 of cushion 51 in order to maintain duct 24 in its proper position in the event of impact by an occupant.

Since the impact cushioning assembly of the present invention is mounted on the support for the object to be covered, the object itself need not be modified to house the cushioning assembly and the impact cushion itself can be located in a somewhat remote, out of the way position. The impact cushioning system may be actuated electronically by means of deceleration sensors appropriately located on the vehicle structure such as those commonly used in automobile safety air bag systems. An altitude or ground-proximity indicator could also be used to sense an impending impact, if the vehicle is an aircraft and if additional time is required to deploy the bag. The invention, although described with reference to vehicle applications, could be used in various environments such as door knobs, gear shifts, control rods, etc. In general, the invention may be used with various elongated objects having a terminal portion where direct contact therewith needs to be prevented but due to functional or structural considerations the cushion cannot be placed at the terminal end of the object.

The terminal end portion of the elongated or narrow ended object upon which safety bag 18 is mounted could also be designed to prevent interference with the safety bag 18 before the bag can be properly deployed. In particular, it may be important to avoid sharp edges in the path of deployment of safety bag 18. If necessary, inflator 16 can be moved along the elongated support either closer to or further away from the terminal end portion, together with the toroidal reservoir chamber 22, with a corresponding shortening or lengthening of the annular duct 24. Furthermore, cushions 38 or 51 may be specifically shaped to conform to terminal end portions of any elongated objects upon which the impact cushioning device of the present invention may be mounted. This may constitute merely redesigning the bottom cover portion 46 so as to properly conform to the geometric shape of the terminal end portion of the object upon which the impact cushioning device of the present invention is mounted. Also, the duct 24 and cushion cover elements can be configured in any practical shape that can be used in the environment of an elongated, relatively narrow cross-section object to be cushioned. Any number of duct and cushion sections can be used, as well. The inflatable ducts themselves all used effectively to position the cushion(s) relative to the terminal end of the object to be cushioned, but additional or alternative positioning devices could be used as well, within the scope of the invention.

In general, it is to be understood that the forms of the invention herein shown and described are to be taken as preferred embodiments thereof and their various changes and shape, material, size and arrangements of parts may be resorted to without departing from the spirit or scope of the present invention as defined by the following claims.

I claim:

1. An impact cushioning device for preventing direct impact with a terminal end of an elongated object comprising a gas pressure source and an inflatable safety bag, said safety bag including a reservoir portion containing said gas pressure source, an inflatable cushion portion and at least one inflatable duct portion providing fluid communication between the gas pressure source and the cushion portion, said reservoir, duct and cushion portions being mounted on said elongated object in a normally deflated and stowed condition at a point remote from said terminal end, and being dimensioned relative to the point of attachment of the cushion device on said elongated object such that upon inflation of said reservoir, duct and cushion portions with gas pressure from the gas pressure source, said cushion portion axially protrudes beyond and extends radially inward to substantially, entirely cover the said terminal end of said elongated object and is restrained at least in part relative to said terminal end in such position by said duct portion, said duct portion including baffle means for restricting free pressurized gas flow between said reservoir portion and said duct portion and between said duct portion and said cushion portion such that, upon inflation, said reservoir is substantially fully inflated prior to inflation of said duct portion which is substantially fully inflated prior to said cushion portion and a pressure gradient exists from said cushion portion to said reservoir portion through a period in which impact can occur due to the restriction provided by said baffle means.

2. An impact cushioning device as claimed in claim 1, said cushion portion comprising at least a pair of cushion elements joined to said inflatable duct portion.

3. An impact cushioning device as claimed in claim 2, said cushion elements configured so that they abut each other along an interface defined by wall sections of said cushion elements extending generally axially relative to said elongated object when inflated.

4. An impact cushioning device as claimed in claim 3, said wall sections being curvilinear in an axial direction relative to said elongated object.

5. An impact cushioning device as claimed in claim 3, said wall sections comprising interlocking axially and radially extending wall portions.

6. An impact cushioning device as claimed in claim 5, said cushion portion in its inflated condition including at least one wall portion engaging the terminal end of said elongated object and a flexible diaphragm wall portion overhanging the terminal end of said elongated object.

7. An impact cushioning device as claimed in claim 6, said cushion portion having a lower inflated pressure than said duct portion and reservoir to provide softer restraint for occupant impact.

8. An impact cushioning device as claimed in claim 5, said cushion elements including a first and a second cushion element, one of said first and second cushion elements overlying the other cushion element and extending laterally over the interface between said cushion elements.

9. An impact cushioning device as claimed in claim 1, said inflatable duct portion being generally annular and surrounding said elongated object.

10. An impact cushioning device as claimed in claim 1, said reservoir portion being generally toroidal and surrounding a portion of said elongated object.

11. An impact cushioning device as claimed in claim 10, said gas pressure source being annular and disposed in said reservoir adjacent said elongated object.

12. An impact cushioning device as claimed in claim 1, said cushion portion in its inflated condition including at least one wall portion engaging the terminal end of said elongated object.

13. An impact cushioning device as claimed in claim 12, said cushion comprising at least a pair of cushion elements joined to said inflatable duct portion.

14. An impact cushioning device as claimed in claim 13, said inflatable duct portion being generally annular and surrounding said elongated object.

15. An impact cushioning device as claimed in claim 14, said cushion elements configured so that they abut each other along an interface defined by wall sections extending generally axially relative to said elongated object when inflated.

16. An impact cushioning device as claimed in claim 15, said wall sections being curvilinear in an axial direction relative to said elongated object.

17. An impact cushioning device as claimed in claim 1 wherein said baffle means comprising partitions in said duct portions and orifices between said duct portions and said cushion portion.

18. An impact cushioning device as claimed in claim 1, said gas pressure source being disposed within said reservoir.

19. An impact cushioning device for use in preventing impact with a terminal end of an elongated object comprising an inflatable air bag, an elongated inflatable duct connected to the bag in fluid communication therewith, and a gas pressure source in fluid communication with said inflatable duct, said duct and bag comprising an enclosed sealed chamber, said bag comprising at least two cushion portions which abut each other in complementary fashion and extends radially inward to substantially entirely cover the terminal end of the elongated object when in an inflated condition, said duct including means for engaging an elongated object and fixing a portion of the duct, remote from both said cushion portions and said terminal end, relative to such object such that, when inflated, said cushion portions abut each other at a predetermined distance from said means for engaging an elongated object, said duct further including baffle means for restricting free-flow of pressurized gas from said gas pressure source through said duct to said cushion portions such that said duct is substantially fully inflated prior to inflation of said cushion portions and a pressure gradient exists between said cushion portions and said duct through a period in which impact can occur.

20. An impact cushioning device as claimed in claim 19, wherein said duct includes means for positioning said cushion portions and restraining motion of the cushion portions in a direction away from said means for engaging an elongated object.

21. An impact cushioning device as claimed in claim 19, said cushion portions including complementary curvilinear wall portions defining an interface along which said cushion portions abut each other, said interface extending in a direction parallel to a direction of impact to be cushioned.

22. An impact cushioning device as claimed in claim 19 wherein said duct is annular.

23. An impact cushioning device as claimed in claim 19, said means for engaging an elongated object comprising an inflatable toroidal reservoir chamber.

24. An impact cushioning device as claimed in claim 23, said gas pressure source being contained within said toroidal reservoir chamber.

25. An impact cushioning device as claimed in claim 19, said cushion portions including complementary abutting wall portions when inflated extending in directions parallel to and transversely of a direction of impact to be cushioned.

26. An impact cushioning device as claimed in claim 25, said cushion portions including an inflatable cover chamber overlying said complementary abutting wall portions when inflated.

* * * * *